US012519788B2

United States Patent
Kunz et al.

(10) Patent No.: US 12,519,788 B2
(45) Date of Patent: Jan. 6, 2026

(54) AUTHENTICATING A DEVICE NOT HAVING A SUBSCRIPTION IN A NETWORK

(71) Applicant: Lenovo (Singapore) Pte. Ltd., New Tech Park (SG)

(72) Inventors: Andreas Kunz, Ladenburg (DE); Sheeba Backia Mary Baskaran, Friedrichsdorf (DE); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 433 days.

(21) Appl. No.: 18/008,417

(22) PCT Filed: Jun. 4, 2021

(86) PCT No.: PCT/IB2021/054936
§ 371 (c)(1),
(2) Date: Dec. 5, 2022

(87) PCT Pub. No.: WO2021/245629
PCT Pub. Date: Dec. 9, 2021

(65) Prior Publication Data
US 2023/0231851 A1    Jul. 20, 2023

Related U.S. Application Data

(60) Provisional application No. 63/035,654, filed on Jun. 5, 2020.

(51) Int. Cl.
*H04M 1/66* (2006.01)
*H04L 9/40* (2022.01)
(Continued)

(52) U.S. Cl.
CPC ....... *H04L 63/0892* (2013.01); *H04W 12/041* (2021.01); *H04W 60/06* (2013.01)

(58) Field of Classification Search
CPC .......... H04L 63/0892; H04L 63/0281; H04W 12/041; H04W 12/06; H04W 12/062; H04W 12/04
See application file for complete search history.

(56) References Cited

U.S. PATENT DOCUMENTS 9,167,427 B2    10/2015  Messana et al.
2007/0091843 A1*  4/2007  Patel ................... H04W 8/04
                                                  370/331
(Continued)

FOREIGN PATENT DOCUMENTS

WO     2020030248 A1    2/2020

OTHER PUBLICATIONS

PCT/IB2021/054936, "Notification of Transmittal of the International Search Report and the Written Opinion of the International Searching Authority, or the Declaration", International Searching Authority, Aug. 13, 2021, pp. 1-16.
(Continued)

*Primary Examiner* — Shantell L Heiber
(74) *Attorney, Agent, or Firm* — Kunzler Bean & Adamson

(57) ABSTRACT

Apparatuses, methods, and systems are disclosed for accessing an NPN using external credentials. One apparatus in a mobile communication network includes a processor and a transceiver that receives a registration request for a UE. Here, the UE does not have a subscription with the mobile communication network. The processor identifies a service provider of the UE and controls the transceiver to send an authentication message to an AAA server of the identified service provider. The processor receives an authentication response containing a master session key from the AAA
(Continued)

server in response to successful authentication of the UE and derives a set of security keys (e.g., $K_{AUSF}$, $K_{SEAF}$) using the master session key.

18 Claims, 11 Drawing Sheets

(51) Int. Cl.
*H04W 12/041* (2021.01)
*H04W 60/06* (2009.01)

(56) References Cited

U.S. PATENT DOCUMENTS

| | | | | |
|---|---|---|---|---|
| 2008/0109877 A1* | 5/2008 | Park | ............... | H04W 8/04 370/469 |
| 2009/0132817 A1* | 5/2009 | Zhao | ............... | H04L 9/0844 713/168 |
| 2009/0172403 A1* | 7/2009 | Liang | ............... | H04W 12/041 380/279 |
| 2015/0181630 A1* | 6/2015 | Miyagawa | ............... | H04W 12/084 370/329 |
| 2020/0053083 A1* | 2/2020 | Kunz | ............... | H04W 12/72 |
| 2020/0068391 A1* | 2/2020 | Liu | ............... | H04W 12/06 |
| 2022/0167157 A1* | 5/2022 | Tiwari | ............... | H04L 9/3242 |

OTHER PUBLICATIONS

Arkko et al., "RFC 5448: Improved Extensible Authentication Protocol Method for 3rd Generation Authentication and Key Agreement (EAP-AKA')", Network Working Group, May 2009, pp. 1-29.
Catt, "AAA Server triggered Network Slice-Specific Re-authentication and Re-authorization procedure when a UE is served by Different PLMNs for 3GPP Access and Non-3GPP Access", 3GPP TSG-SA WG2 Meeting #138E S2-2003066, Apr. 20-23, 2020, pp. 1-6.
Motorola Mobility et al., "KI #1, New Sol: UE external subscription data stored in the SNPN", 3GPP TSG-SA WG2 Meeting #139E (e-meeting) S2-2004212, Jun. 1-12, 2020, pp. 1-7.
Lenovo et al., "Update of Solution#6", 3GPP TSG-SA3 Meeting #102Bis-e S3-211025, Mar. 1-5, 2021, pp. 1-5.
3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.
3GPP, "3rd Generation Partnership Project; Technical Specification Group Services and System Aspects; Study on enablers for network automation for the 5G System (5GS); Phase 2 (Release 17)", 3GPP TR 23.700-91 V0.3.0, Jan. 2020, pp. 1-35.
3GPP, "3rd Generation Partnership Project; Technical Specification Group Services and System Aspects; Study on enhanced support of non-public networks (Release 17)", 3GPP TR 23.700-07 V0.3.0, Jan. 2020, pp. 1-42.
3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, pp. 1-582.
3GPP, "3rd Generation Partnership Project; Technical Specification Group Services and System Aspects; 3GPP System Architecture Evolution (SAE); Security aspects of non-3GPP accesses (Release 15)", 3GPP TS 33.402 V15.1.0, Jun. 2018, pp. 1-72.
3GPP, "3rd Generation Partnership Project; Technical Specification Group Services and System Aspects; Security architecture and procedures for 5G system (Release 16)", 3GPP TS 33.501 V16.2.0, Mar. 2020, pp. 1-227.
3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

* cited by examiner

AUTHENTICATING A DEVICE NOT HAVING A SUBSCRIPTION IN A NETWORK

CROSS-REFERENCE TO RELATED APPLICATIONS

This application claims priority to U.S. Provisional Patent Application No. 63/035,654 entitled "ACCESSING SNPN WITH EXTERNAL CREDENTIALS" and filed on Jun. 5, 2020 for Andreas Kunz, Sheeba Backia Mary Baskaran, and Genadi Velev, which application is incorporated herein by reference.

FIELD

The subject matter disclosed herein relates generally to wireless communications and more particularly relates to accessing a non-public network ("NPN") with external credentials.

BACKGROUND

In certain wireless communication systems, in order to register to a standalone non-public network ("SNPN"), the device (i.e., user equipment ("UE")) needs to get authenticated and it is necessary to setup security as specified for the Fifth Generation ("5G") system in Third generation Partnership Project ("3GPP") Technical Specification ("TS") 33.501. However, the SNPN may not hold any subscription of this particular UE and the SNPN thus is not able to authenticate the UE.

BRIEF SUMMARY

Disclosed are procedures for accessing an NPN using external credentials. Said procedures may be implemented by apparatus, systems, methods, or computer program products.

One method of an authentication function in a mobile communication network includes receiving a registration request for a User Equipment ("UE"), where the UE does not have a subscription with the mobile communication network. The method includes identifying a service provider of the UE and sending an authentication message to an Authentication, Authorization and Accounting ("AAA") server of the identified service provider. The method includes receiving an authentication response containing a master session key from the AAA server in response to successful authentication of the UE and deriving a set of security keys using the master session key.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
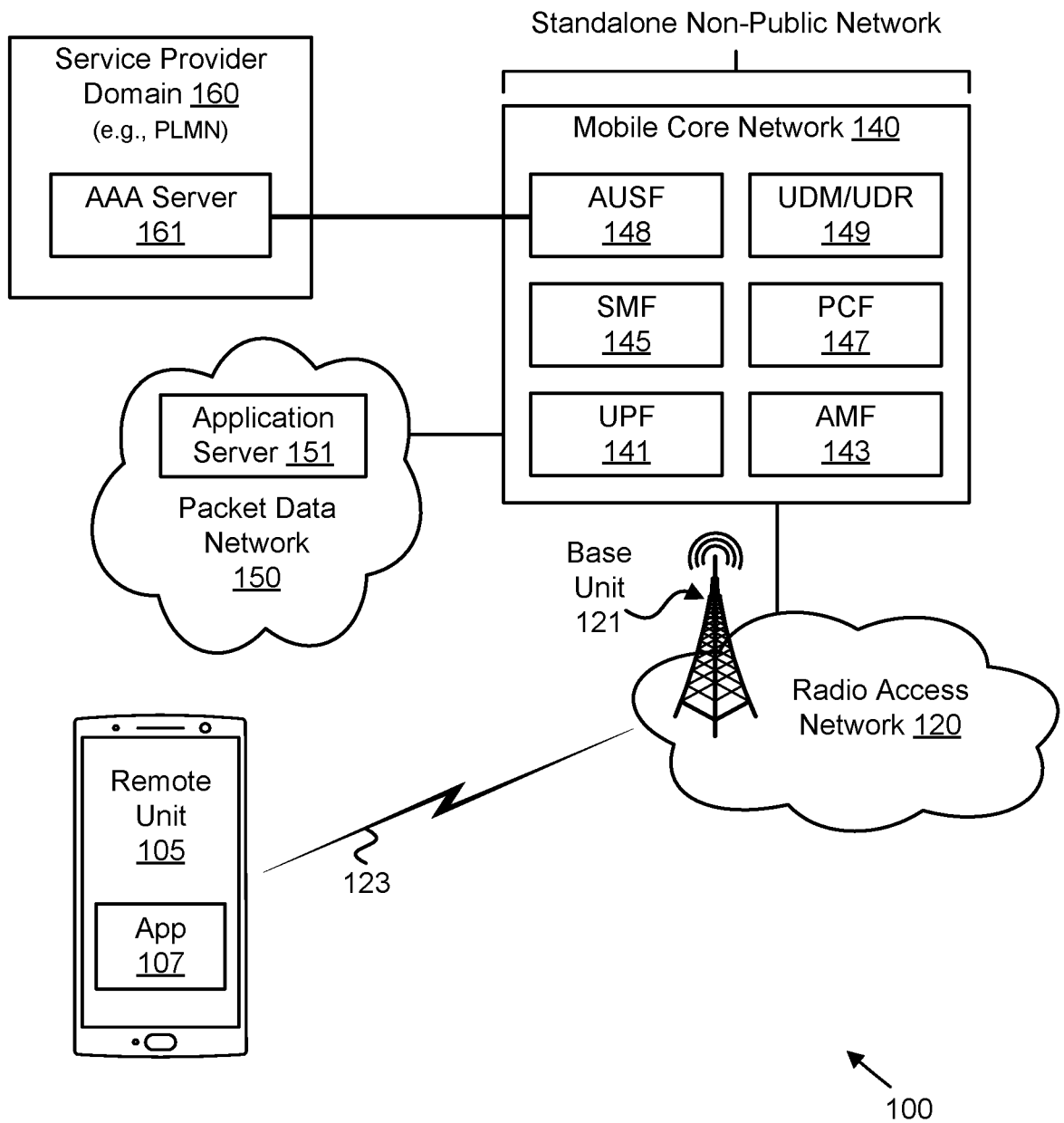
FIG. 1 is a schematic block diagram illustrating one embodiment of a wireless communication system for accessing an NPN using external credentials.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for accessing a standalone non-public network with external credentials. In order to register to a standalone non-public network ("SNPN"), the UE needs to get authenticated and it is necessary to setup security as specified for the 5G system in 3GPP TS 33.501. The problem is that the SNPN does not hold any subscription of this particular UE and the SNPN thus is not able to authenticate the UE. However, where the UE belongs to a Service Provider which has a service agreement with the SNPN, then the UE would be able to access the SNPN using is subscription to the Service Provider. The problem is how to perform primary authentication and authorization for SNPN network access when the UE's security credentials are stored in entity outside of the SNPN trust domain and when this entity performs the authentication of the UE. In one embodiment, the Service Provider does not support AUSF and/or UDM functionality. In other embodiments, the Servicer Provider supports AUSF and UDM functionality, but the primary authentication and authorization uses AUSF and UDM functionality in the SNPN.

The current 3GPP specification do not discuss how the key provisioning between the SNPN and the AAA Server can be executed and what would have to be performed in order to allow a UE, unknown to the SNPN, to gain access to the SNPN and to get authenticated as a legitimate UE for using the service.

To remedy the above problems, new behavior of a UE is disclosed. In some embodiments, the UE derives the keys CK', IK' from the keys CK, IK, using the SNN of the SNPN as access network identity parameter as well its length. Here, CK may represent the Cipher Key and IK may represent the Integrity Key. In some embodiments, the UE derives the CK', IK' from the CK, IK, using the Service Provider Identifier ("SP-ID") as access network identity parameter as well its length. In certain embodiments, the UE derives the Master Key ("MK") with using either username of the Network Access Identifier ("NAI") or assigned UE ID. In certain embodiments, the UE receives SNPN assigned UE ID via Non-Access Stratum ("NAS") Security Mode Command ("SMC") message.

To remedy the above problems, new behavior of an AMF is disclosed. In some embodiments, the AMF performs authorization based on the realm of the NAI and the configured list of allowed Service Providers. In some embodiments, the AMF creates a binding of the assigned UE ID from the SNPN and the subscription ID (username of the NAI) from the Service Provider. In some embodiments, the AMF sends SNPN assigned UE ID in the NAS SMC message to the UE. For re-authentication, the AMF may send the identity to the NAI in the authentication request to an Authentication Proxy, such as the AUSF, an AAA proxy, and/or AAA interworking function.

To further remedy the above problems, new behavior of an authentication function is disclosed. In some embodiments, an Authentication Proxy ("AUP"), such as the AUSF, an AAA proxy, and/or AAA interworking function, performs authorization based on the realm of the NAI and the configured list of allowed Service Providers. In some embodiments, the AUP receives an authentication response from the AAA Server, the response containing the MSK. In some embodiments, the AUP derives the $K_{AUSF}$ and $K_{SEAF}$ from the MSK.

In some embodiments, the AUP requests authentication from the AAA Server, may provide the SNPN SNN to the AAA Server. In some embodiments, the AUP receives an authentication response from the AAA Server, the response containing the $K_{SP\_AUSF}$ or CK', IK', validity time, Routing ID and, the NAI with the real username of the UE. In some embodiments, the AUP derives the MK with using either username of the NAI or assigned UE ID. In some embodiments, the AUP provides validity time and UE ID to AMF/SEAF.

To further remedy the above problems, new behavior of an AAA Server is disclosed. In various embodiments, the AAA Server may be preconfigured with the Routing ID of the UDM that stores the default profile and pool/number of UE IDs. In some embodiments, the AAA Server derives the CK', IK' from the CK, IK, using the SNN of the SNPN as access network identity parameter as well its length. In some embodiments, the AAA Server derives the CK', IK' from the CK, IK, using the Service Provider Identifier SP-ID as access network identity parameter as well its length. In some embodiments, the AAA Server derives MK with using username of the NAI. In some embodiments, the AAA Server provides $K_{SP\_AUSF}$ or CK', IK', validity time, Routing ID and, in case the Extensible Authentication Protocol ("EAP") method supported privacy, the NAI with the real username of the UE.

To further remedy the above problems, new behavior of a UDM is disclosed. In various embodiments, the UDM is preconfigured with a Default Profile without security context for virtual subscriptions for the Service Provider. Additionally, the UDM may be preconfigured with a pool of (virtual/temporary) subscriptions or a max number of active subscriptions that can be assigned to the subscribers of the Service Provider, or dynamically generates a subscription on request.

In some embodiments, the UDM assigns and activates a subscription with Default Profile, if available, to a subscriber of the Service Provider. In some embodiments, the UDM binds the subscription UE ID with the NAI of the subscriber of the Service Provider. In some embodiments, the UDM rejects subscription if max number of active subscriptions are exhausted or no more subscriptions can be assigned from the preconfigured pool of subscriptions. In some embodiments, the UDM deactivates the UE's subscription and removes the binding once the UE with the assigned UE ID deregisters, so that the UE ID may be assigned to another subscriber from the same Service Provider.

FIG. 1 depicts a wireless communication system 100 for accessing an NPN using external credentials, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the 3GPP specifications. For example, the RAN 120 may be a New Generation RAN ("NG-RAN"), implementing NR Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM).

In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR in Unlicensed Spectrum ("NR-U") operation, the base unit 121 and the remote unit 105 communicate over unlicensed (i.e., shared) radio spectrum.

In one embodiment, the mobile core network 140 is a 5G core network ("5GC") or an Evolved Packet Core ("EPC"), which may be coupled to a packet data network 150, like the Internet and private data networks, among other data networks. A remote unit 105 may have a subscription or other account with the mobile core network 140. Each mobile core network 140 belongs to a single PLMN. The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, and a Unified Data Management function ("UDM"). In some embodiments, the UDM is co-located with a User Data Repository ("UDR"), depicted as combined entity "UDM/UDR" 149. In various embodiments, the mobile core network 140 may also include an Authentication Server Function ("AUSF"), a Network Repository Function ("NRF") (used by the various NFs to discover and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In various embodiments, the service provider domain 160 is a PLMN where the remote unit 105 has a subscription. The service provider domain 160 is external to the mobile core network 140. As described in greater detail below, a remote unit 105 may use an external credential, i.e., a credential of the service provider domain 160, to register with the mobile core network 140. Here, authenticating the remote unit 105 may involve the AAA server 161 located in the service provider domain 160.

While FIG. 1 depicts components of a 5G RAN and a 5G core network, the described embodiments for accessing an NPN using external credentials apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems supporting accessing an NPN using external credentials.

Figure 2:
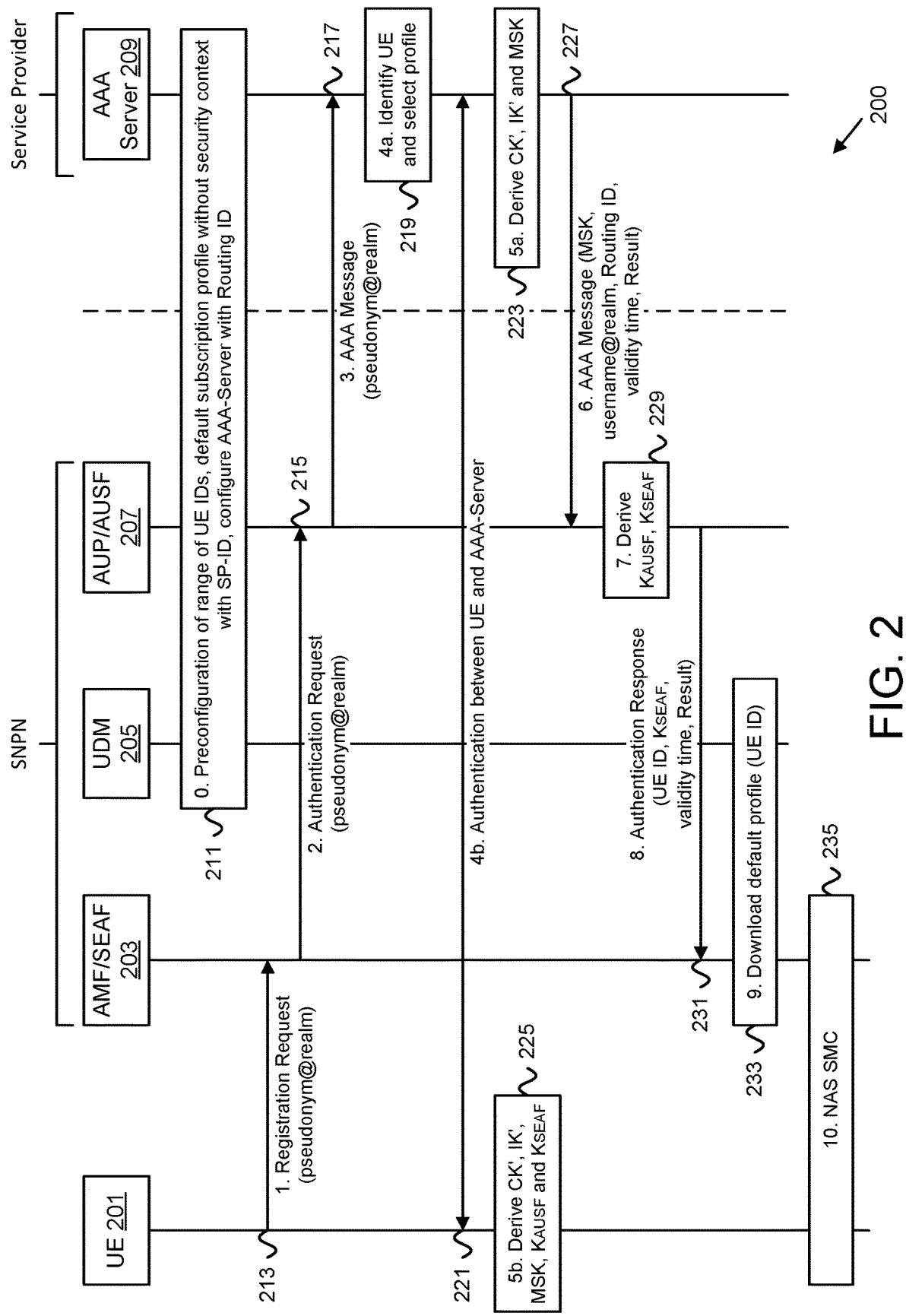
FIG. 2 is a diagram illustrating one embodiment of a procedure for registration using an external authentication and key agreement.

FIG. 2 depicts a procedure 200 for registration using an external authentication and key agreement, according to embodiments of the disclosure. The procedure 200 involves the UE 201, the AMF and/or SEAF (depicted as AMF/SEAF 203) in the SNPN, the UDM 205 in the SNPN, the AUP/AUSF 207 in the SNPN, as well as an external AAA server 209 in the service provider domain. The AUP may be collocated with the AUSF, and both are shown together in Figure for simplicity.

The SNPN may have a configured UDM 205 and AUP that are handling the authentications with the external AAA Server(s) 209. The discovery of the UDM 205 and AUP can be based on pre-configuration in the SNPN, or based on the SP-ID (realm part of the UE's NAI), or based on a Routing ID identifying the UDM 205 and stored in the subscription profile for this SNPN in the AAA Server 209.

According to a first solution, the Master Session Key ("MSK") is provisioned from an AAA server to the authentication proxy function (e.g., called "AUP," which can be an enhanced AUSF, AAA proxy, or AAA interworking function), wherein the AUP derives the $K_{AUSF}$ and $K_{SEAF}$. In this solution, the following assumptions are made:

The Service Provider with its own identifier (i.e., SP-ID) has a business relationship (i.e., service agreement) with the SNPN and is allowed to use a certain number of subscriptions in the SNPN, identified by individual UE IDs which may be, for example, a Subscriber Permanent Identifier ("SUPI"), an International Mobile Subscriber Identifier ("IMSI"), Generic Public Subscription Identifier ("GPSI"), etc. The UE ID represents the temporary subscription identifier in the SNPN for the UE. The UE is a subscriber with the Service Provider, and both have their shared set of credentials which may or may not be stored in the Universal Subscriber Identity Module ("USIM") in the UE 201. Also, this credentials may be a username/password, public/private key set, certificates, etc.

The Service Provider is allowed to use a certain "Default Profile" in the SNPN for all subscribers of the Service Provider. This "Default Profile" is the same for the pool or number of UE IDs configured or assigned in the SNPN. The UE ID in the SNPN is not related to the subscription identifier of the Service Provider, here called "username," i.e., the subscriber of the Service Provider who is registering at the SNPN may or may not get a different UE ID in the SNPN for subsequent registrations in the SNPN. The UE ID may stay the same for re-authentications of the same username with the Service Provider. The Service Provider may set a validity time which expresses the interval to the next required re-authentication of the UE 201, or the lifetime of the service provider issued subscription information for the UE 201 at the SNPN.

The registration procedure 200 begins at Step 0 where the Service Provider has a service agreement with the SNPN and the SNPN assigns a SNPN specific UE ID to the subscribers of the Service Provider after successful authentication. The assignment of the UE ID could be dynamically created, or from a certain pool or number of SNPN specific UE IDs, or just inactivated UE IDs that are available and the SNPN just counts the number of active temporary subscriptions in the SNPN for this specific Service Provider. The Service Provider and the SNPN acknowledge a "Default Profile" for the pool of UE IDs, i.e., all subscribers from the Service Provider have the same profile with respect to, e.g., QoS, NSSAIs, etc. (see block 211).

In important difference to a normal subscriber profile in the 5G system is that the Default Profile does not contain any security related information, i.e., no public/private key pair for SUPI (de)concealment, nor shared root secret K. This has the advantage that the Service Provider can just reserve a number of virtual subscriptions in the SNPN with a pre-agreed set of features in the default profile.

At Step 1, the UE 201 sends a Registration Request with the NAI (e.g., in the form of 'pseudonym@realm' or 'username@realm') of the Service Provider as UE identity to the AMF/SEAF 203 (see messaging 213). The username of the NAI maybe set to anonymous if the EAP method of the Service Provider supports privacy, or to a pre-configured pseudonym or the subscription identifier of the Service Provider. The username part of the NAI could be also a Subscriber Concealed Identifier ("SUCI"), SUPI, IMSI or any other identifier meaningful to the AAA Server 209.

At Step 2, the AMF/SEAF 203 detects based on the realm of the NAI that the Registration Request is not from a subscriber of the SNPN but from a Service Provider. The AMF/SEAF 203 authorizes the request by verifying the realm of the NAI and whether the SNPN has an active agreement with this Service Provider. The AMF/SEAF 203 forwards the request to the AUP/AUSF 207 which may be preconfigured for handling requests towards external Service Providers (see messaging 215).

At Step 3, the AUP/AUSF 207 may perform authorization of the registration request by verifying the realm of the NAI and whether the SNPN has an active agreement with this Service Provider. The authorization in the AUP/AUSF 207 may be performed in case the AMF/SEAF 203 does not perform it, or in addition to it. The AUP/AUSF 207 identifies the Service Provider and sends a related message to the corresponding AAA Server 209 (see messaging 217). In case the AAA Server 209 supports Service Based Interfaces, then the AUP/AUSF 207 sends a corresponding authentication request to the AAA Server 209, if not, then the AUP/AUSF 207 sends a AAA protocol authentication request message, including the UE NAI (e.g., pseudonym@realm). In certain embodiments, the message to the AAA server 209 also contains the SNPN Serving Network Name ("SNN").

At Step 4, the AAA Server 209 verifies the authentication request based on the username. If the AAA Server 209 supports privacy, then the related EAP message, e.g., in tunnel mode, will receive the real identity protected in the first exchange with the UE 201. If the AAA Server 209 supports SUCI as a username and its de-concealment, then the AAA Server 209 de-conceals the SUCI to a SUPI as username. The AAA Server 209 selects the subscriber profile based on the username (see block 219) and performs an EAP based authentication with the UE 201, using the pre-shared credentials in the UE 201 and the subscriber profile in the AAA Server 209 (see messaging 221).

At Step 5a, after successful authentication the AAA Server 209 derives the CK', IK' from the CK, IK (see block 223). In one embodiment, the key derivation is implemented as specified in 3GPP TS 33.402. The AAA Server 209 may follow the normal key derivation and derives the Master Key ("MK") from CK', IK', e.g., using the input to the key derivation according to IETF RFC 5448, i.e., MK=PRF' (IK'|CK', "EAP-AKA'"| Identity), with PRF as Pseudo-Random number Function and Identity as username in the subscription profile of the Service Provider, where the symbol indicates a concatenation operation to build the input string.

The AAA Server 209 may create the Master Session Key ("MSK") or an Extended Master Session Key ("EMSK"). In some embodiments, the MSK is substring of the MK, i.e., MK[640 . . . 1151] (where notation "[n . . . m]" denotes a substring from bit 'n' to bit 'm') and the EMSK is the last 512 bits of MK (i.e., MK[1152 . . . 1663]). Alternatively, the $K_{AUSF}$ may be derived with a Key Derivation Function (KDF) with CK', IK' as input and the SNN as follows: $K_{AUSF}$: KDF(CK'||IK', SNN), where the symbol '||' indicates the concatenation of CK' and IK'.

At Step 5b, the UE 201 derives the same keys accordingly (see block 225).

The AAA Server 209 may select the stored Routing ID (preconfigured in Step 0) for the SNPN as well as the validity time for one authentication period, i.e., after which the AMF/SEAF 203 should trigger a re-authentication request.

At Step 6, the AAA Server 209 sends the result of the authentication back in an authentication response to the AUP/AUSF 207 (see messaging 227). This message may include at least one of: the UE NAI (e.g., pseudonym@realm), MSK, validity time, Routing ID and the NAI (e.g., username@realm) with the real username of the subscription profile in the AAA Server of the UE.

At Step 7, the AUP/AUSF 207 verifies the response and derives the $K_{AUSF}$ from the MSK (see block 229). The AUP/AUSF 207 additionally derives the $K_{SEAF}$ from the $K_{AUSF}$, e.g., according to 3GPP TS 33.501.

At Step 8, the AUP/AUSF 207 may send an authentication response to the AMF/SEAF 203 (see messaging 231). Here, the authentication response may include one or more of the following parameters: authentication result from the Service Provider and the $K_{SEAF}$, a UE ID (e.g., SUPI), the validity time, i.e., time until the next re-authentication. The AUP/AUSF 207 may include the NAI (e.g., pseudonym@realm) received in Step 2 so that the AMF/SEAF 203 can related the response message.

At Step 9, the AMF/SEAF 203 may store the UE ID and the NAI from the Service Provider (e.g., username@realm) for potential re-authentications after expiry of the validity time. The AMF/SEAF 203 may request the subscription profile from the UDM 205 either based on the NAI or the UE ID (see block 233).

At Step 10, the AMF/SEAF 203 may perform from now on the normal procedures like for a normal 5G subscriber, e.g., NAS SMC, AS SMC, etc. and sets up the security for the NAS protocol and the radio interface (see block 235). The procedure 200 ends.

Figure 3A:
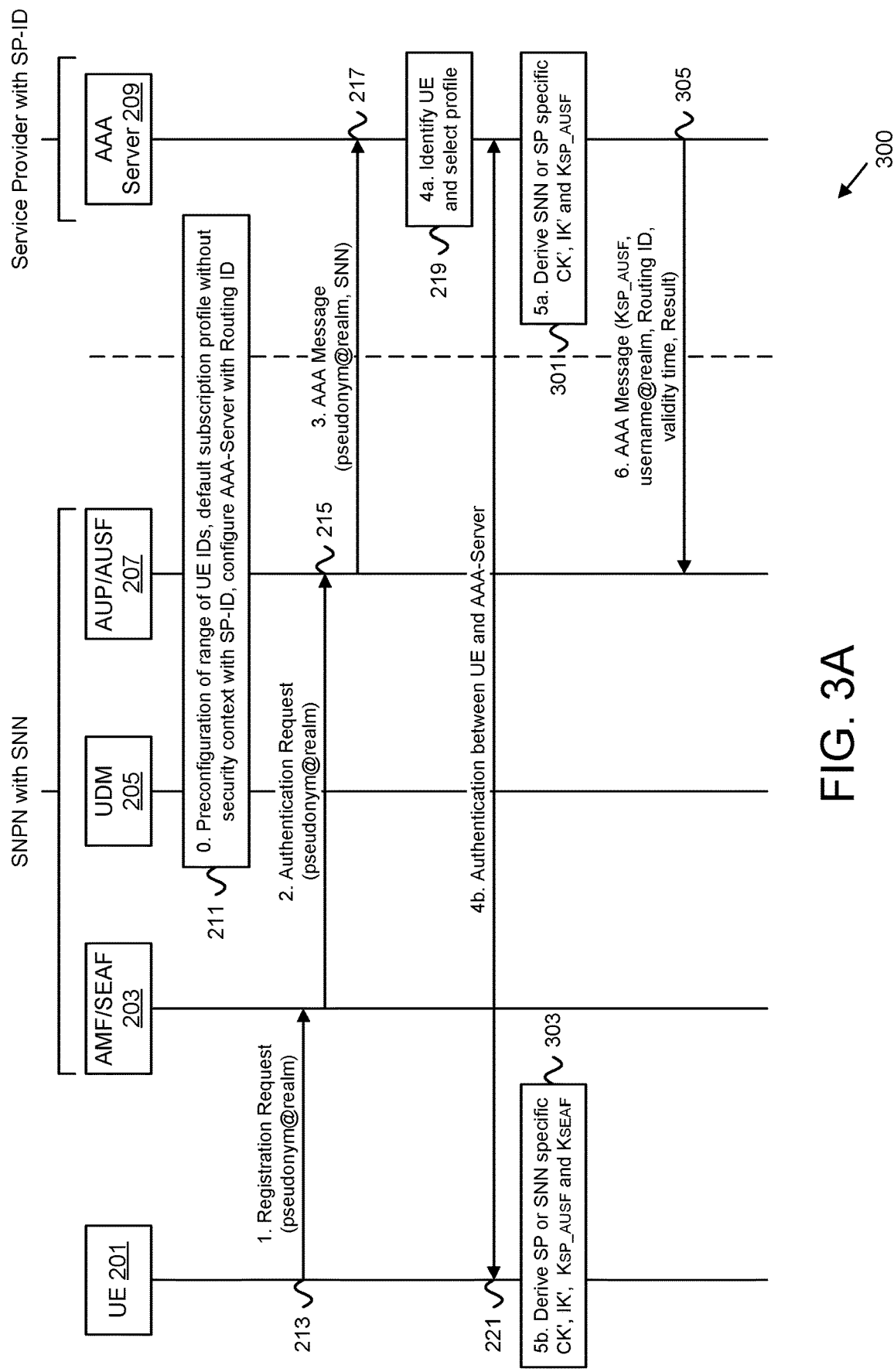
FIG. 3A is a diagram illustrating another embodiment of a procedure for registration using an external authentication and key agreement.
Figure 3B:
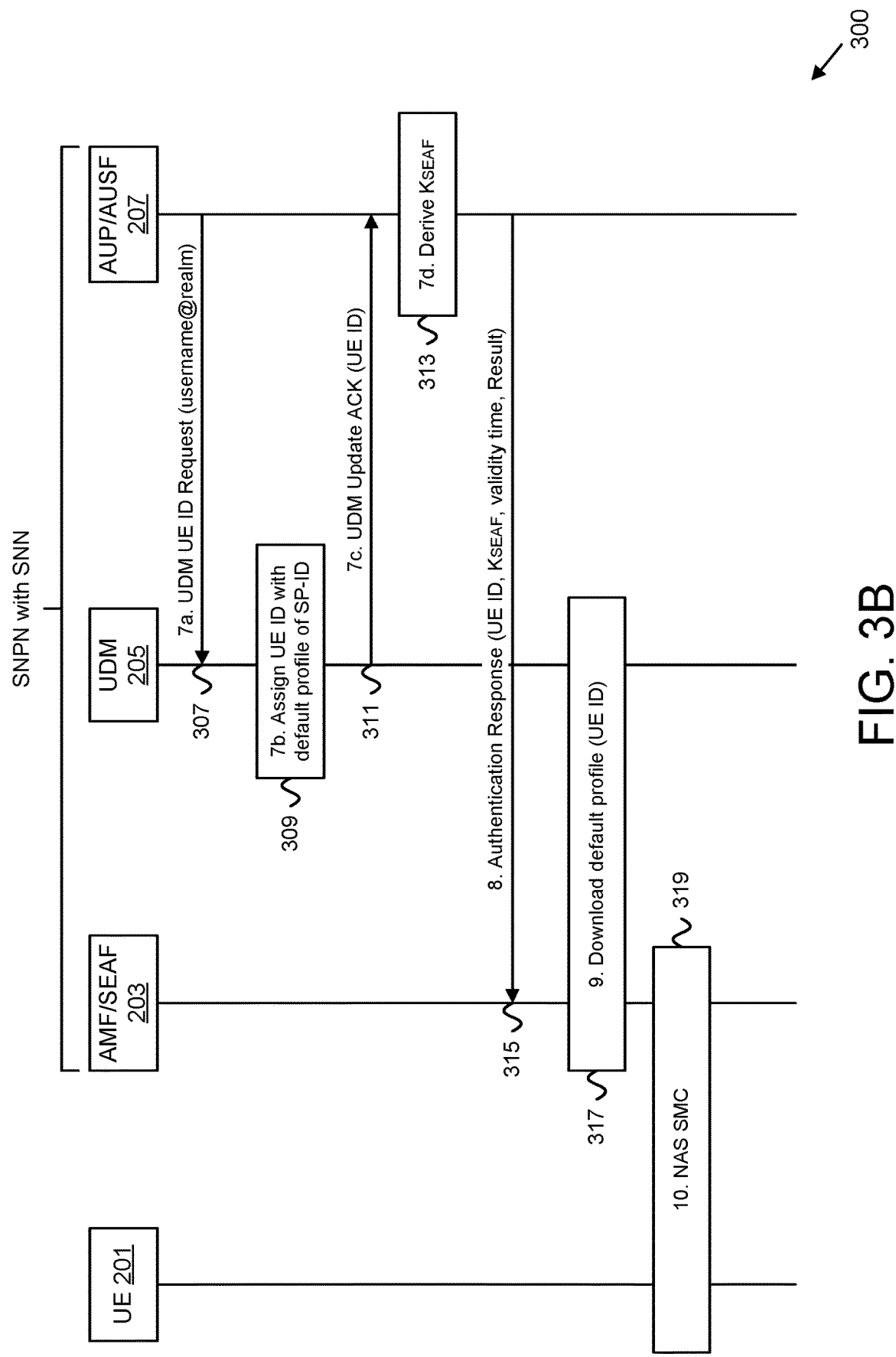
FIG. 3B is a continuation of the diagram in FIG. 3A.

FIGS. 3A-3B depict a procedure 300 for registration with external Authentication and Key Agreement, according to embodiments of the disclosure. The procedure 300 involves the UE 201, the AMF/SEAF 203 in the SNPN, the UDM 205 in the SNPN, the AUP/AUSF 207 in the SNPN, and the AAA server 209 in the service provider domain.

According to a second solution, the key $K_{AUSF}$ is provisioned from the AAA server 209 to the AUP/AUSF 207. In this solution, the following assumptions are made:

The Service Provider with its own identifier SP-ID has a service agreement with the SNPN and is allowed to use a certain number of subscriptions in the SNPN, identified by individual UE IDs which could be, e.g., a SUPI, IMSI, GPSI, etc. The UE ID represents the temporary subscription identifier in the SNPN for the UE 201. The UE 201 is a subscriber with the Service Provider, and both have their shared set of credentials which may or may not be stored in the USIM in the UE 201. Also, this credentials may be a username/password, public/private key set, certificates, etc.

The Service Provider is allowed to use a certain "Default Profile" in the SNPN for all subscribers of the Service Provider. This "Default Profile" is the same for the pool or number of UE IDs configured or assigned in the SNPN. The UE ID in the SNPN is not related to the subscription identifier of the Service Provider, here called "username," i.e., the subscriber of the Service Provider who is registering at the SNPN may or may not get a different UE ID in the SNPN for subsequent registrations in the SNPN. The UE ID may stay the same for re-authentications of the same username with the Service Provider. The Service Provider may set a validity time which expresses the interval to the next required re-authentication of the UE 201, or the lifetime of the service provider issued subscription information for the UE 201 at the SNPN.

The SNPN may have a configured UDM 205 and AUP that are handling the authentications with external AAA Server(s) 209. In some embodiments, the AUP is co-located with the AUSF, as depicted in FIGS. 3A-3B. The discovery of UDM 205 and AUP can be based on pre-configuration in the SNPN, or based on the SP-ID (realm part of the UE's NAI), or based on a Routing ID identifying the UDM 205 and stored in the subscription profile for this SNPN in the AAA Server 209.

At FIG. 3A, the registration procedure 300 begins by performing the same steps 1-4 as discussed above with reference to FIG. 2 (see blocks 211 and 219; see messaging 213, 215, 217, and 221).

At Step 5a, after successful authentication the AAA Server 209 derives the CK', IK' from the CK, IK, using the SNN of the SNPN or the Service Provider Identifier SP-ID as access network identity parameter as well its length (see block 301). In one embodiment, the key derivation is implemented as specified in 3GPP TS 33.402. The AAA Server 209 may follow the normal key derivation and derives the Master Key ("MK") from CK', IK', using the input to the key derivation according to IETF RFC 5448, i.e., MK=PRF'(IK'|CK', "EAP-AKA'"|Identity), with PRF as Pseudo-Random number Function and Identity as username in the subscription profile of the Service Provider, where the symbol '|' indicates a concatenation operation to build the input string.

The AAA Server 209 may create the Extended Master Session Key (EMSK), which are the last 512 bits of MK (i.e., MK[1152 ... 1663]) and the $K_{SP\_AUSF}$, which are the most significant 356 bits of EMSK. Alternatively, the $K_{SP\_AUSF}$ may be derived with a Key Derivation Function (KDF) with CK', IK' as input and the SNN as follows: $K_{SP\_AUSF}$: KDF(CK'||IK', SNN), where the symbol '||' indicates the concatenation of CK' and IK'.

At Step 5b, the UE 201 derives the same keys accordingly (see block 303).

The AAA Server 209 may select the stored Routing ID (preconfigured in Step 0) for the SNPN as well as the validity time for one authentication period, i.e., after which the AMF/SEAF 203 should trigger a re-authentication request.

At Step 6, the AAA Server 209 sends the result of the authentication back in an authentication response to the AUP/AUSF 207 (see messaging 305). This message may include at least one of: the UE NAI (e.g. pseudonym@realm), $K_{SP\_AUSF}$, validity time, Routing ID and the NAI (e.g. username@realm) with the real username of the subscription profile in the AAA Server 209 of the UE 201. In an alternative, the MK or the EMSK is sent instead of the $K_{S\_AUSF}$ and the AUP/AUSF 207 will derive the $K_{AUSF}$ from it in Step 7 before deriving the $K_{SEAF}$.

Continuing on FIG. 3B, at Step 7a the AUP/AUSF 207 verifies the response and selects the UDM 205 that stores the default profile of the service provider, e.g., based on pre-configuration or based on the Routing ID. The AUP/AUSF 207 sends request for assignment of internal identifier for the UE 201 with external subscription (e.g., called a UE ID request) to the UDM 205 with the NAI of the Service Provider subscriber (e.g., username@realm) (see messaging 307).

At Step 7b, the UDM 205 assigns a SNPN-specific UE ID and binds it to the NAI of the Service Provider subscriber (e.g., username@realm) (see block 309). The UE ID may be a SUPI, IMSI, GPSI or any other suitable identity inside the SNPN. The assigned UE ID is globally unique but applicable only in the SNPN domain, i.e., there is no signaling carrying the UE ID outside the SNPN domain.

The UDM 205 may generate dynamically a UE ID, or may have a pool of SNPN-specific identities for the particular SP or just may have an allowed number of subscriptions with a counter that is counting the current number of subscriptions that are activated of this Service Provider. The UDM 205 may deactivate the UE ID and remove the binding at the time when the UE 201 deregisters from the Service Provider.

The UDM 205 may reject the request from the AUP/AUSF 207 if the number of activated subscriptions in the UDM 205 exceed the agreed maximum number with the Service Provider or no UE ID is left in the pool of UE IDs preconfigured for the Service Provider, i.e., in this case the UE 201 would be rejected and cannot access the SNPN until another UE 201 of this Service Provider deregisters.

At Step 7c, the UDM 205 may provide the assigned UE ID to the AUP/AUSF 207 (see messaging 311). The UDM 205 may also provide the NAI where the UE ID is assigned to, so that the AUSF can relate the messages.

At Step 7d, the AUP/AUSF 207 may derive the $K_{SEAF}$ from the $K_{SP\_AUSF}$ according to 3GPP TS 33.501 (see block 313).

At Step 8, the AUP/AUSF 207 may send an authentication response to the AMF/SEAF 203 (see messaging 315). Here, the authentication response may include one or more of the following parameters: authentication result from the Service Provider and the $K_{SEAF}$, the assigned UE ID, the validity time, i.e., time until the next re-authentication. The AUP/AUSF 207 may include the NAI (e.g., pseudonym@realm) received in Step 3 so that the AMF/SEAF 203 can related the response message.

At Step 9, the AMF/SEAF 203 may store the binding of the UE ID and the NAI from the Service Provider (e.g., username@realm) for potential re-authentications after expiry of the validity time. The AMF/SEAF 203 may request the subscription profile from the UDM 205 either based on the NAI or the UE ID (see block 317). In case of a later reauthentication, the AMF/SEAF 203 needs to initiate the authentication request to the AUP/AUSF 207 with the NAI from the Service Provider and not with the assigned UE ID.

At Step 10, the AMF/SEAF 203 may perform from now on the normal procedures like for a normal 5G subscriber, e.g., NAS SMC, AS SMC, etc. and sets up the security for the NAS protocol and the radio interface (see block 319). The procedure 300 ends.

Figure 4A:
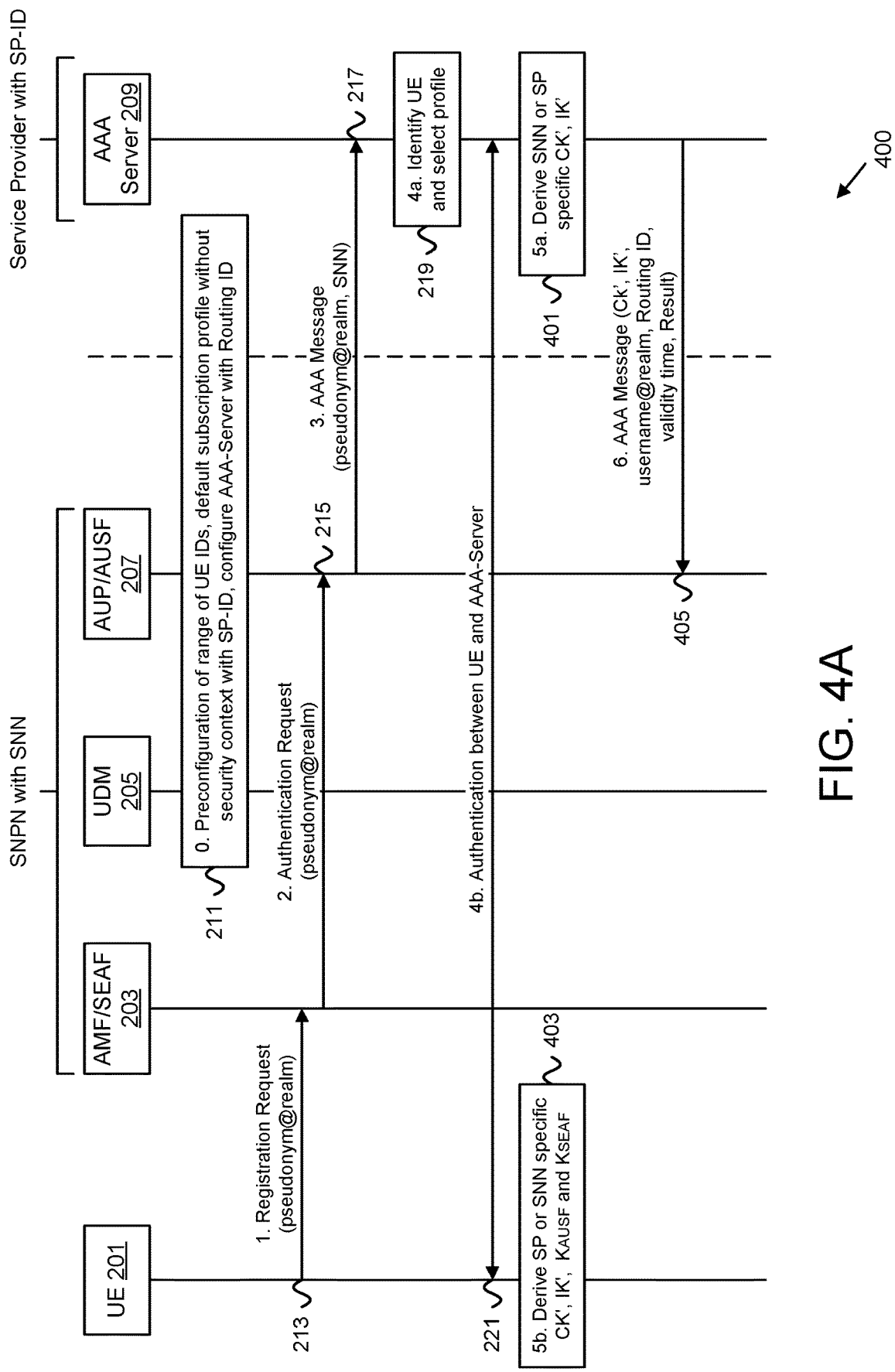
FIG. 4A is a diagram illustrating an alternative embodiment of a procedure for registration using an external authentication and key agreement.
Figure 4B:
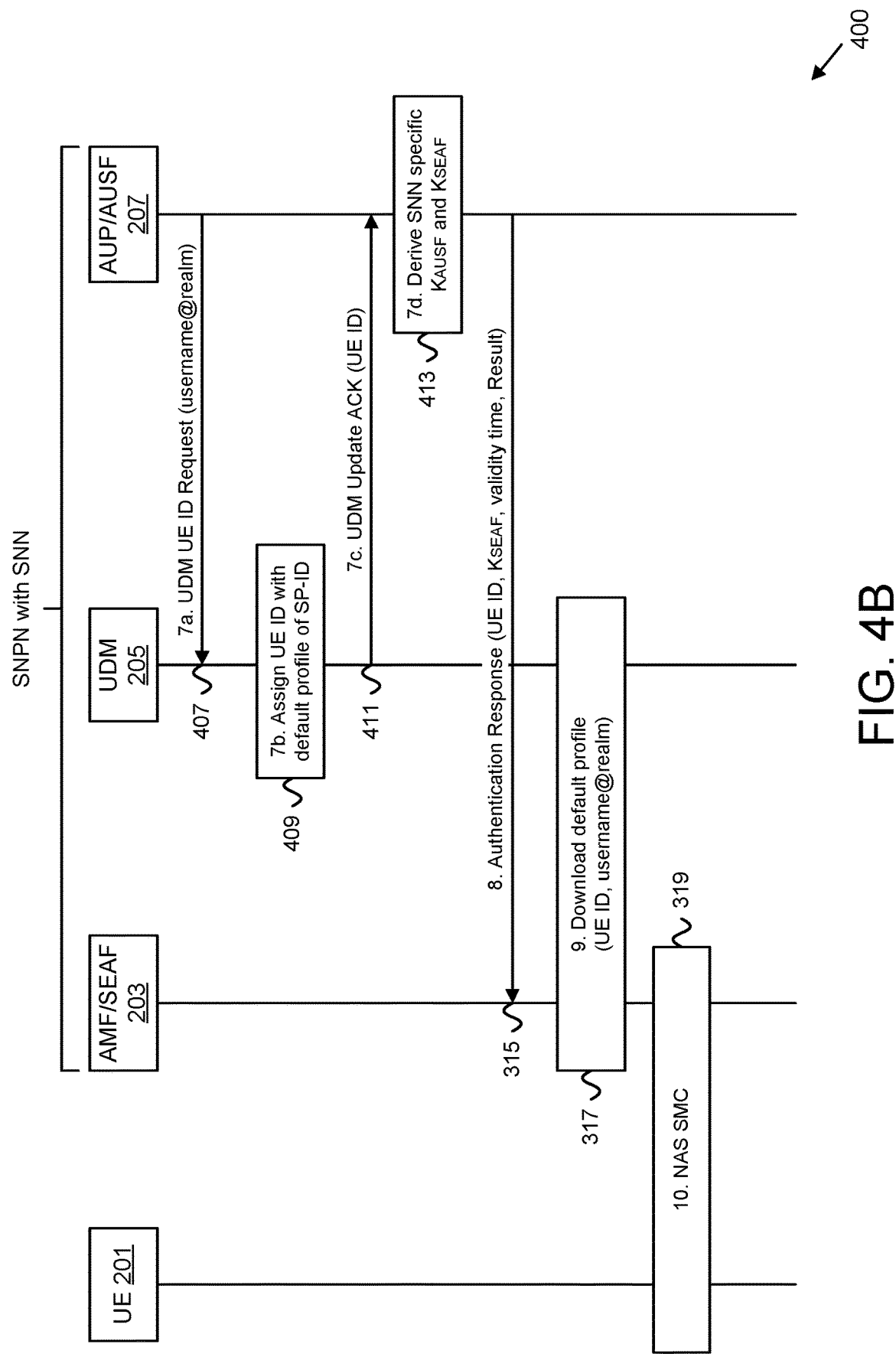
FIG. 4B is a continuation of the diagram in FIG. 4A.

FIGS. 4A-4B depict an example of a registration procedure 400 with alternative key derivation (as compared to the procedure 400), according to embodiments of a third solution of the disclosure. According to the third solution, the key derivation described in FIGS. 4A-4B is modified between steps 4 to step 7 as follows with a different key derivation and distribution scheme.

The procedure 400 begins by performing the same steps 0-4 as discussed above with reference to FIG. 2 (see blocks 211 and 219; see messaging 213, 215, 217, and 221).

At Step 5a, after successful authentication the AAA Server 209 derives the CK', IK' from the CK, IK, using the SNN of the SNPN or the Service Provider Identifier SP-ID as access network identity parameter as well its length (see block 401). In one embodiment, the key derivation is implemented as specified in 3GPP TS 33.402. The AAA Server 209 may select the stored Routing ID (i.e., preconfigured in Step 0) for the SNPN as well as the validity time for one authentication period, i.e., after which the AMF/SEAF 203 should trigger a re-authentication request.

At Step 5b, the UE derives security keys according to the third solution (see block 403). Here, the UE may derive SP and/or SNN specific keys CK', IK', $K_{AUSF}$ and $K_{SEAF}$. The UE 205 derives the Master Key ("MK") from CK', IK' as described below.

At Step 6, the AAA Server 209 sends the result of the authentication back in an authentication response to the AUP/AUSF 207 (see messaging 405). This message may include the CK', IK', validity time, Routing ID and, the NAI with the real username in the subscription profile of the AAA Server 209 of the UE 201.

Continuing on FIG. 4B, at Step 7a, the AUP/AUSF 207 verifies the response and selects the UDM 205 that stores the default profile of the service provider, e.g., based on pre-configuration or based on the Routing ID. The AUP/AUSF 207 sends a UE ID request to the UDM 205 with the NAI of the Service Provider subscriber (see messaging 407).

At Step 7b, the UDM 205 assigns a UE ID and binds it to the NAI of the Service Provider subscriber (see block 409). The UE ID may be a SUPI, IMSI, GPSI or any other suitable identity inside the SNPN. The UDM 205 may generate dynamically a UE ID, or may have a pool of subscriptions or just may have an allowed number of subscriptions with a counter that is counting the current number of subscriptions that are activated of this Service Provider.

The UDM 205 may deactivate the UE ID and remove the binding when the UE 201 deregisters from the Service Provider. The UDM 205 may reject the request from the AUP/AUSF 207 if the number of activated subscriptions in the UDM 205 exceed the agreed maximum number with the Service Provider or no UE ID is left in the pool of UE IDs preconfigured for the Service Provider, i.e., in this case the UE 201 would be rejected and cannot access the SNPN until another UE 201 of this Service Provider deregisters.

At Step 7c, the UDM 205 provides the assigned UE ID to the AUP/AUSF 207 (see messaging 411).

At Step 7d, the AUP/AUSF 207 may follow the normal key derivation and derives the Master Key ("MK") from CK', IK', using the input to the key derivation according to IETF RFC 4448, i.e., MK=PRF'(IK"|CK', "EAP-AKA'"| Identity), with PRF as Pseudo-Random number Function and Identity as username of the NAI received in Step 6 from the AAA Server 209 of the Service Provider, where the symbol '|' indicates a concatenation operation to build the input string (see block 413). The AUP/AUSF 207 may create the Extended Master Session Key ("EMSK"), which are the last 512 bits of MK (i.e., MK[1152 . . . 1663]) and the $K_{AUSF}$, which are the most significant 256 bits of EMSK. The AUP/AUSF 207 may derive the $K_{SEAF}$ from the $K_{AUSF}$ according to 3GPP TS 33.501, e.g., $K_{SEAF}$=KDF($K_{AUSF}$, SNN, Length of SNN).

The pseudonym in the NAI sent by the UE 201 in Step 1 may be a SUCI and the username sent from the AAA Server 209 to the AUP/AUSF 207 may be a SUPI. In this case, the UE 201 also uses the SUPI to derive the MK (see block 403).

The procedure 400 completes by performing the same steps 8-10 as discussed above with reference to FIG. 4B (see messaging 315; see blocks 317 and 319).

According to a fourth solution, the procedure 400 is modified at Steps 7d and 10 as follows with a different key derivation and distribution scheme:

At modified step 7d, the AUP/AUSF 207 may follow the normal key derivation and derives the Master Key (MK) from CK', IK', using the input to the key derivation according to IETF RFC 4448, i.e., MK=PRF'(IK'|CK', "EAP-AKA'"| Identity), with PRF as Pseudo-Random number Function and Identity as UE ID received in Step 7c from the UDM 205, where the symbol '|' indicates a concatenation operation to build the input string. The UE ID may be a SUPI or an IMSI. Note that the UE key derivation at Step 5 would also be modified so that the keys derived in the UE 201 and in the network match.

At modified step 10, the AMF/SEAF 203 sends a NAS SMC message to the UE 201, also containing the assigned UE ID. Step 4 in the UE 201 would be performed at this point, as the UE 201 has to wait with the key derivation until the UE ID is received in order to derive the MK and following derived keys up to $K_{AMF}$ and the NAS keys so that it can verify the integrity of the received NAS SMC.

Figure 5:
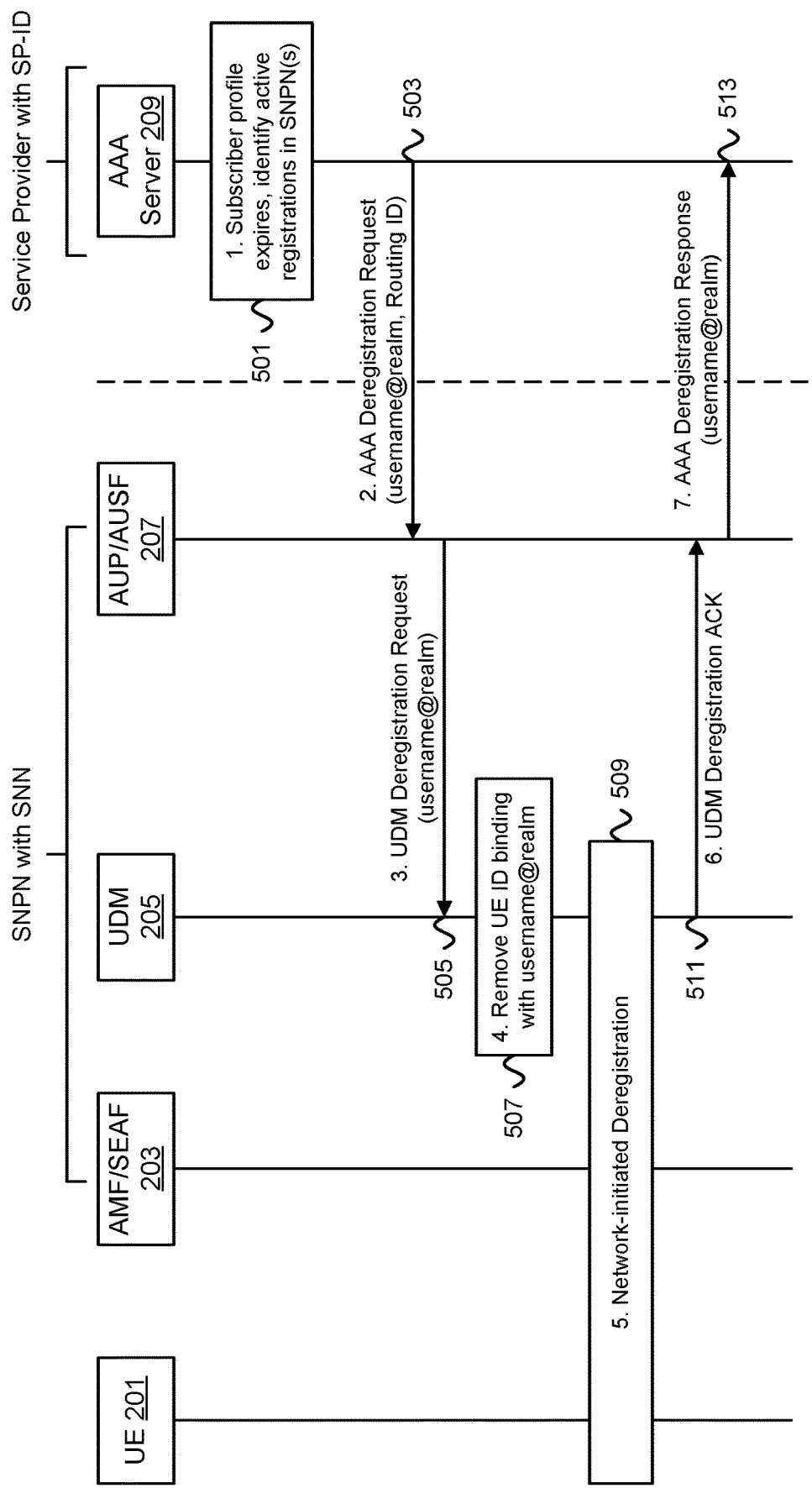
FIG. 5 is a diagram illustrating one embodiment of a procedure for subscription revocation.

FIG. 5 depicts an example of subscription revocation procedure 500, according to embodiments of the disclosure. According to a fifth solution, it could be that a UE 201 is no longer subscribed or got deregistered from the AAA Server 209 for various reasons. In this case the SNPNs that have still an active registration for this particular UE 201 should also deregister the UE 201.

At Step 1, the AAA Server 209 may identify whether there are active registrations in any SNPNs for the expired or deactivated subscriber profile (see block 501).

At Step 2, the AAA Server 209 may send a deregistration request message to the AUP/AUSF 207 that may include the NAI with the real username in the subscription profile of the AAA Server 209 of the UE 201 and may include the Routing ID (see messaging 503).

At Step 3, the AUP/AUSF 207 verifies the response and selects the UDM 205 that stores the default profile of the service provider, e.g., based on pre-configuration or based on the Routing ID. The AUP/AUSF 207 sends a deregistration request to the UDM 205 with the NAI of the Service Provider subscriber (see messaging 505).

At Step 4, the UDM 205 removes the binding between UE ID (e.g., SUPI) and the NAI. The UDM 205 may deactivate the UE ID for further usage (see block 507).

At Step 5, the UDM 205 triggers the network initiated deregistration procedure according to 3GPP TS 23.502, which de-registers the UE 201 from the SNPN (see block 509).

At Step 6, the UDM 205 sends a deregistration acknowledgement to the AUP/AUSF 207 and may include the NAI so that the AUP/AUSF 207 can relate the response to the request (see messaging 511).

At Step 7, the AUP/AUSF 207 sends a deregistration response message to the AAA Server 209 which may include the username@realm so that the AAA Server 209 can relate the response to the request and may remove the subscription profile (see messaging 513).

Figure 6:
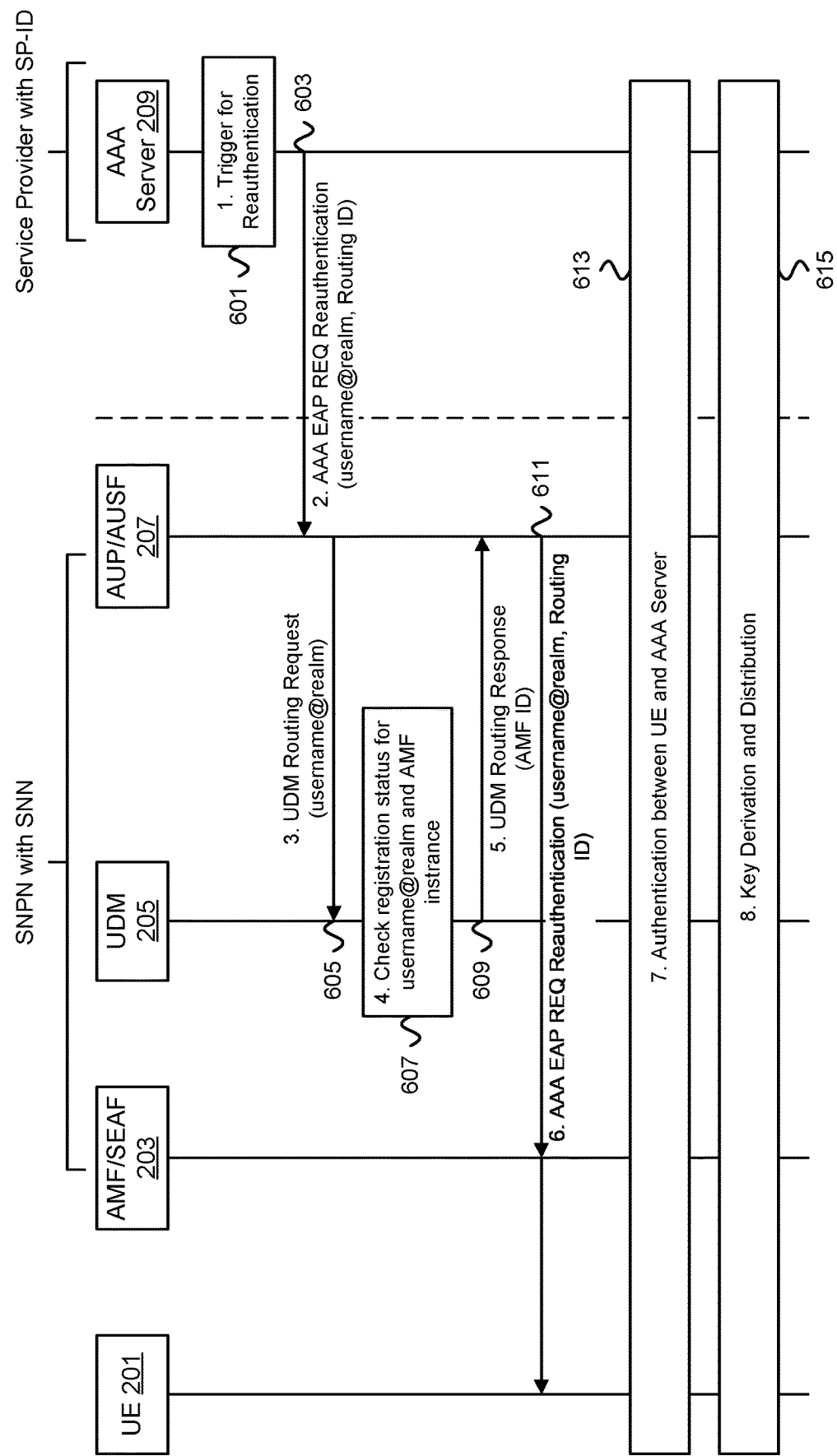
FIG. 6 is a diagram illustrating one embodiment of a procedure for reauthentication.

FIG. 6 depicts a procedure 600 for AAA-Server-triggered Reauthentication, according to embodiments of the disclosure.

According to a sixth solution, the AAA Server 209 may want to trigger a reauthentication for various reasons, e.g., in order to check whether the subscriber is still located at the SNPN.

At Step 1, the AAA Server 209 may get triggered that reauthentication is required for a particular subscriber, e.g., based on a timer or validity time set by the AAA server as specified in the previous embodiments (see block 601).

At Step 2, the AAA Server 209 may send an EAP Request for reauthentication to the AUP/AUSF 207 that may include the NAI of the Service Provider subscriber and may include the Routing ID (see messaging 603).

At Step 3, the AUP/AUSF 207 verifies the response and selects the UDM 205 that stores the default profile of the service provider, e.g., based on pre-configuration or based on the
Routing ID. The AUP/AUSF 207 sends a Routing request to the UDM 205 with the NAI of the Service Provider subscriber, since the AUP/AUSF 207 does not have the binding which UE 201 is served with which AMF/SEAF 203 (see messaging 605).

At Step 4, the UDM 205 may check the registration status of the UE 201 with the NAI and looks up the AMF/SEAF 203 instance serving the UE 201 (see block 607).

At Step 5, the UDM 205 may return the AMF/SEAF 203 instance ID to the AUP/AUSF 207 in a routing response message (see messaging 609).

At Step 6, the AUP/AUSF 207 may forwards the EAP Request for reauthentication to the AMF/SEAF 203 which may send it to the UE 201 in a NAS container message (see messaging 611).

At Step 7, authentication between the UE 201 and the AAA Server 209 is carried out and the procedure may be followed with any of the key derivations described in the above solutions, as well as any further steps (see block 613).

At Step 8, the UE 205, AUP/AUSF 207 and/or the AAA Server 209 perform Key Derivation (and distribution, where applicable) according to any of the above described solutions (See block 615).

Figure 7:
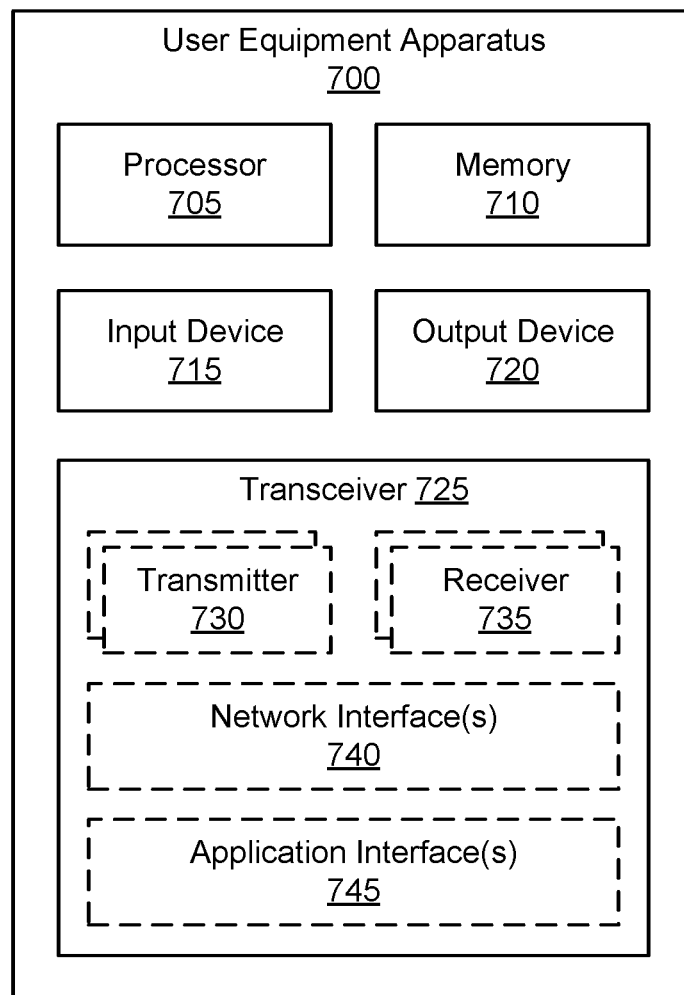
FIG. 7 is a diagram illustrating one embodiment of a user equipment apparatus that may be used for accessing an NPN using external credentials.

FIG. 7 depicts a user equipment apparatus 700 that may be used for accessing an NPN using external credentials, according to embodiments of the disclosure. In various embodiments, the user equipment apparatus 700 is used to implement one or more of the solutions described above. The user equipment apparatus 700 may be one embodiment of the remote unit 105 and/or the UE 201, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panels supporting one or more beams. Additionally, the transceiver 725 may support at least one network interface 740 and/or application interface 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the user equipment apparatus 700 to implement the above described UE behaviors. In certain embodiments, the processor 705 may include an application processor (also known as "main processor") which manages application-domain and operating system ("OS") functions and a baseband processor (also known as "baseband radio processor") which manages radio functions.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to accessing an NPN using external credentials. For example, the memory 710 may store various parameters, panel/beam configurations, resource assignments, policies, and the like as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, a Liquid Crystal Display ("LCD"), a Light Emitting Diode ("LED") display, an Organic LED ("OLED") display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
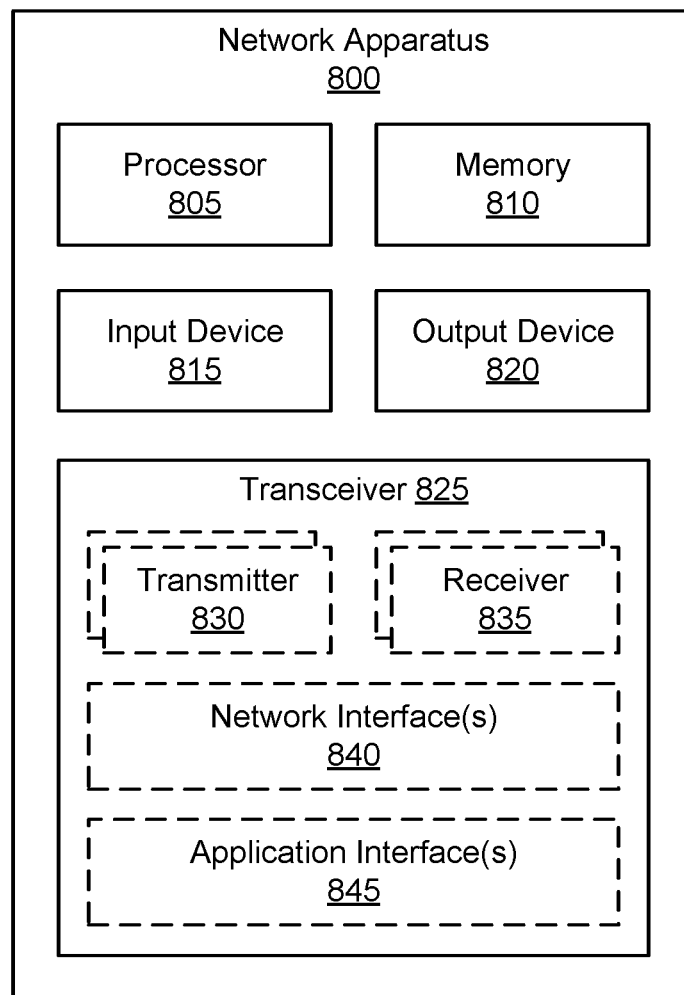
FIG. 8 is a diagram illustrating one embodiment of a network apparatus that may be used for accessing an NPN using external credentials.

FIG. 8 depicts a network apparatus 800 that may be used for accessing an NPN using external credentials, according to embodiments of the disclosure. In one embodiment, network apparatus 800 may be one implementation of an authentication proxy apparatus in a mobile communication network, such as the AUSF 148, and/or the AUP/AUSF 207, as described above. Furthermore, the network apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network apparatus 800 may not include any input device 815 and/or output device 820. In various embodiments, the network apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 85. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the network apparatus 800 is a RAN node (e.g., gNB) that communicates with one or more UEs, as described herein. In such embodiments, the processor 805 controls the network apparatus 800 to perform the above described RAN behaviors. When operating as a RAN node, the processor 805 may include an application processor (also known as "main processor") which manages application-domain and operating system ("OS") functions and a baseband processor (also known as "baseband radio processor") which manages radio functions.

In various embodiments, the network apparatus 800 is an AMF and/or SEAF in a first mobile communication network (e.g., NPN). In such embodiments, the processor 805 controls the network apparatus 800 to implement the above described behaviors of an AMF/SEAF in an NPN. For example, the processor 805 may facilitate registration, authentication, deregistration, and/or reauthentication of a UE with a NPN using external credentials (i.e., credentials with the service provider), as described herein.

In various embodiments, the network apparatus 800 is a UDM/UDR in a first mobile communication network (e.g., NPN). In such embodiments, the processor 805 controls the network apparatus 800 to implement the above described behaviors of a UDM/UDR in an NPN. For example, the processor 805 may facilitate registration, authentication, deregistration, and/or reauthentication of a UE with a NPN using external credentials (i.e., credentials with the service provider), as described herein.

In various embodiments, the network apparatus 800 is an AAA server in a service provider domain (e.g., PLMN). In such embodiments, the processor 805 controls the network apparatus 800 to implement the above described behaviors of an AAA server in the service provider domain. For example, the processor 805 may facilitate authentication, subscription revocation, and/or reauthentication of a UE with a NPN using external credentials (i.e., credentials with the service provider), as described herein.

In various embodiments, the network apparatus 800 is an authentication proxy in a first mobile communication network (i.e., NPN). In such embodiments, the processor 805 controls the network apparatus 800 to implement the above described behaviors of an AUP and/or AUSF in an NPN. For example, the transceiver 825 may receive a registration request for a UE. Here, the UE does not have a subscription with the NPN. Here, the processor 805 identifies a service provider (e.g., PLMN) of the UE and controls the transceiver 825 to send an authentication message to an AAA server of the identified service provider. The processor 805 receives an authentication response from the AAA server in response to successful authentication of the UE, the authentication response containing a master session key ("MSK"). Additionally, the processor 805 derives a set of security keys (e.g., $K_{AUSF}$, $K_{SEAF}$) using the MSK.

In some embodiments, the registration request contains a NAI. Here, the first method includes authorizing the registration request by identifying a realm of the NAI and verifying that a service agreement exists between the first mobile communication network and the service provider. In certain embodiments, an access management function (i.e., AMF) serving the remote unit may authorize the registration request prior to sending to the authentication proxy function.

In some embodiments, the authentication response includes a routing identifier of the first mobile communication network and a validity time for the master session key, where reauthentication of the remote unit is required after expiry of the validity time. In some embodiments, the derived set of security keys includes an authentication server function key (i.e., $K_{AUSF}$) and a security anchor function key (i.e., $K_{SEAF}$), where the $K_{AUSF}$ is derived from the master session key (not from the extended master session key) and the $K_{SEAF}$ is derived from the $K_{AUSF}$. In one embodiment, the $K_{AUSF}$ is specific to the first mobile communication network. In another embodiment, the $K_{AUSF}$ is specific to the service provider. In other embodiments, the $K_{AUSF}$ is neither specific to the first mobile communication network nor to the service provider.

In certain embodiments, the registration request is received from an access management function (i.e., AMF) serving the remote unit. Here, the first method includes sending a second authentication response to the serving access management function, the second authentication response containing a UE identifier of the remote unit, a validity time and the $K_{SEAF}$. In further embodiments, the first mobile communication network may be a non-public network ("NPN"), such as a standalone non-public network ("SNPN"), and the service provider may be a second mobile communication network, such as a Public Land Mobile Network ("PLMN").

In some embodiments, the processor 805 further binds a first identifier of the remote unit (e.g., the NAI) that is specific to the service provider to a second identifier that is specific to the first mobile communication network (e.g., UE ID or SUPI). In certain embodiments, the processor 805 further receives a deregistration request from the AAA server to deregister the remote unit and verifies the deregistration request. In such embodiments, the processor 805 further triggers removal of the binding of first identifier to second identifier (e.g., by sending a deregistration request to UDM).

In some embodiments, the processor 805 further receives a reauthentication request from the AAA server and sends a routing request to a user data management function. In such embodiments, the processor 805 further receives a routing response containing an identifier of a serving access management function and forwards the reauthentication request to the serving access management function.

In certain embodiments, the reauthentication request includes a routing identifier. In such embodiments, sending the routing request includes both identifying the user data management function from the routing identifier and sending the routing request to the identified user data management function.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to accessing an NPN using external credentials. For example, the memory 810 may store parameters, configurations, resource assignments, policies, and the like, as described above. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the PLMN and/or RAN, as described herein. Although only one transmitter 830 and one receiver 835 are illustrated, the network apparatus 800 may have any suitable number of transmitters 830 and receivers 835. Further, the transmitter(s) 830 and the receiver(s) 835 may be any suitable type of transmitters and receivers.

The transceiver 825 is operable on unlicensed spectrum, wherein the transceiver 825 includes a plurality of gNB panels. As used herein, a "gNB panel" refers to a logical entity that may be mapped to physical gNB antennas. Depending on the implementation, a "gNB panel" can have an operational role of Unit of antenna group to control its Tx beam independently.

Figure 9:
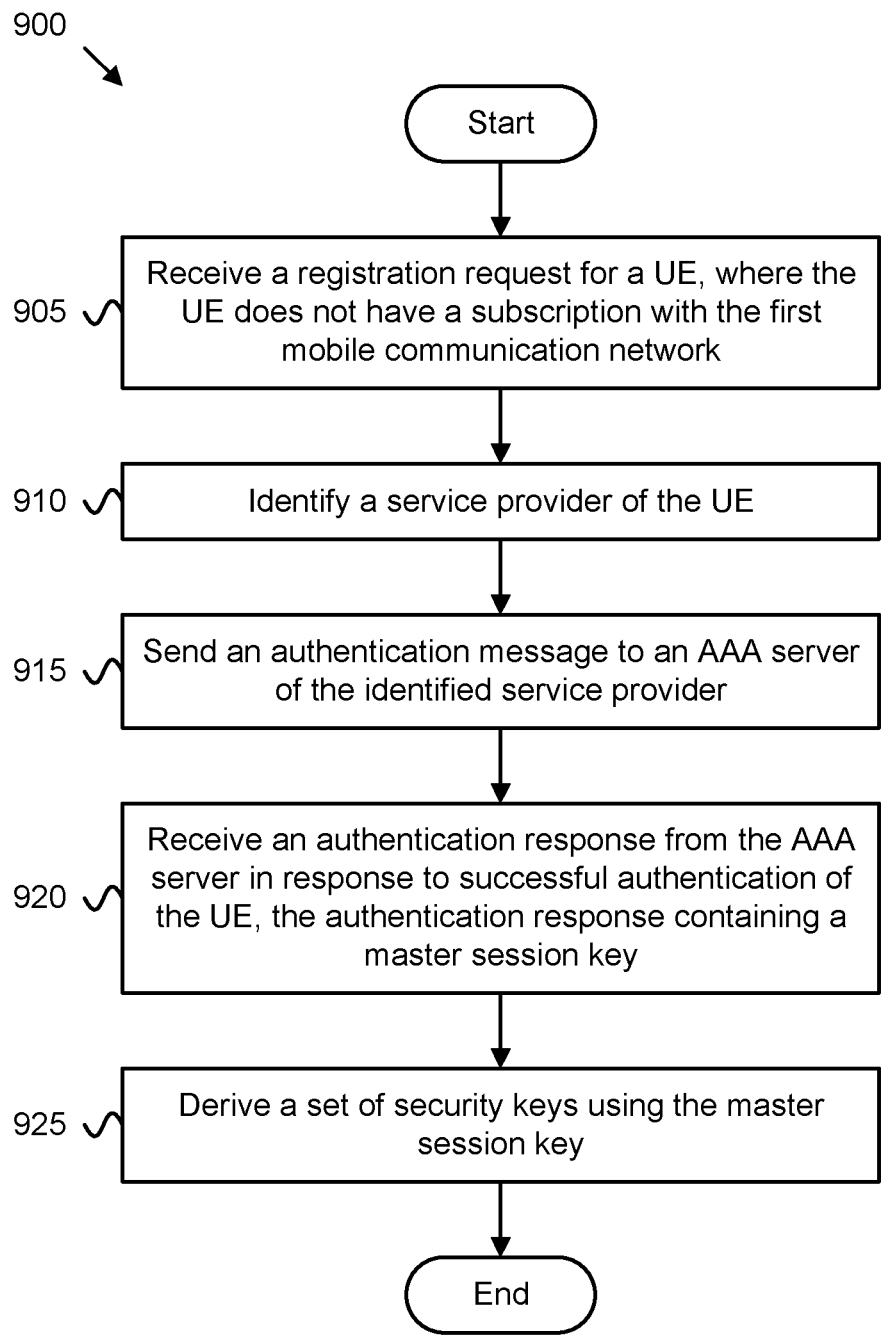
FIG. 9 is a flowchart diagram illustrating one embodiment of one method for accessing an NPN using external credentials.

FIG. 9 depicts one embodiment of a method 900 for accessing an NPN using external credentials, according to embodiments of the disclosure. In various embodiments, the method 900 is performed by an authentication proxy apparatus in a mobile communication network, such as the AUSF 148, and/or the AUP/AUSF 207, and/or the network apparatus 800, described above. In some embodiments, the method 900 is performed by a processor, such as a microcontroller, a microprocessor, a CPU, a GPU, an auxiliary processing unit, a FPGA, or the like.

The method 900 begins and receives 905 a registration request for a UE, where the UE does not have a subscription with the mobile communication network. The method 900 includes identifying 910 a service provider of the remote unit. The method 900 includes sending 915 an authentication message to an AAA server of the identified service provider. The method 900 includes receiving 920 an authentication response from the AAA server in response to successful authentication of the UE, where the authentication response contains a master session key. The method 900 includes deriving 925 a set of security keys using the master session key. The method 900 ends.

Disclosed herein is a first apparatus for accessing an NPN using external credentials, according to embodiments of the disclosure. The first apparatus may be implemented by an authentication proxy apparatus in a mobile communication network, such as the AUSF 148, and/or the AUP/AUSF 207, and/or the network apparatus 800, described above. The first apparatus includes a transceiver (e.g., supporting a network interface) that receives a registration request for a remote unit (e.g., a UE). Here, the remote unit does not have a subscription with the first mobile communication network.

The first apparatus includes a processor that identifies a service provider of the remote unit and controls the transceiver to send an authentication message to an AAA server of the identified service provider. The processor receives an authentication response from the AAA server in response to successful authentication of the remote unit, the authentication response containing a master session key and derives a set of security keys (e.g., $K_{AUSF}$, $K_{SEAF}$) using the master session key.

In some embodiments, the registration request contains a NAI. Here, the first method includes authorizing the registration request by identifying a realm of the NAI and verifying that a service agreement exists between the first mobile communication network and the service provider. In certain embodiments, an access management function (i.e., AMF) serving the remote unit may authorize the registration request prior to sending to the authentication proxy function.

In some embodiments, the authentication response includes a routing identifier of the first mobile communication network and a validity time for the master session key, where reauthentication of the remote unit is required after expiry of the validity time. In some embodiments, the derived set of security keys includes an authentication server function key (i.e., $K_{AUSF}$) and a security anchor function key (i.e., $K_{SEAF}$), where the $K_{AUSF}$ is derived from the master session key (not from the extended master session key) and the $K_{SEAF}$ is derived from the $K_{AUSF}$. In one embodiment, the $K_{AUSF}$ is specific to the first mobile communication network. In another embodiment, the $K_{AUSF}$ is specific to the service provider. In other embodiments, the $K_{AUSF}$ is neither specific to the first mobile communication network nor to the service provider.

In certain embodiments, the registration request is received from an access management function (i.e., AMF) serving the remote unit. Here, the first method includes sending a second authentication response to the serving access management function, the second authentication response containing a UE identifier of the remote unit, a validity time and the $K_{SEAF}$ In further embodiments, the first mobile communication network may be a non-public network ("NPN"), such as a standalone non-public network ("SNPN"), and the service provider may be a second mobile communication network, such as a Public Land Mobile Network ("PLMN").

In some embodiments, the processor further binds a first identifier of the remote unit (e.g., the NAI) that is specific to the service provider to a second identifier that is specific to the first mobile communication network (e.g., UE ID or SUPI). In certain embodiments, the processor further receives a deregistration request from the AAA server to deregister the remote unit and verifies the deregistration request. In such embodiments, the processor further triggers removal of the binding of first identifier to second identifier (e.g., by sending a deregistration request to UDM).

In some embodiments, the processor further receives a reauthentication request from the AAA server and sends a routing request to a user data management function. In such embodiments, the processor further receives a routing response containing an identifier of a serving access management function and forwards the reauthentication request to the serving access management function.

In certain embodiments, the reauthentication request includes a routing identifier. In such embodiments, sending the routing request includes both identifying the user data management function from the routing identifier and sending the routing request to the identified user data management function.

Disclosed herein is a first method for accessing an NPN using external credentials, according to embodiments of the disclosure. The first method may be performed by an authentication proxy function in a mobile communication network, such as the AUSF 148, and/or the AUP/AUSF 207, and/or the network apparatus 800, described above. The first method includes receiving a registration request for a remote unit (i.e., a UE), where the remote unit does not have a subscription with the first mobile communication network.

The first method includes identifying a service provider of the remote unit and sending an authentication message to an AAA server of the identified service provider. The first method includes receiving an authentication response from the AAA server in response to successful authentication of the remote unit, the authentication response containing a master session key and deriving a set of security keys (e.g., $K_{AUSF}$, $K_{SEAF}$) using the master session key.

In some embodiments, the registration request contains a NAI. In such embodiments, the first method may include authorizing the registration request by identifying a realm of the NAI and verifying that a service agreement exists between the first mobile communication network and the service provider. In certain embodiments, an access management function (i.e., AMF) serving the remote unit may authorize the registration request prior to sending to the authentication proxy function.

In some embodiments, the authentication response includes a routing identifier of the first mobile communication network and a validity time for the master session key, where reauthentication of the remote unit is required after expiry of the validity time. In some embodiments, the derived set of security keys includes an authentication server function key ("$K_{AUSF}$") and a security anchor function key ("$K_{SEAF}$"), where the $K_{AUSF}$ is derived from the master session key (not from the extended master session key) and the $K_{SEAF}$ is derived from the $K_{AUSF}$. In one embodiment, the $K_{AUSF}$ is specific to the first mobile communication network. In another embodiment, the $K_{AUSF}$ is specific to the service provider. In other embodiments, the $K_{AUSF}$ is neither specific to the first mobile communication network nor to the service provider.

In certain embodiments, the registration request is received from an access management function (i.e., AMF) serving the remote unit. In such embodiments, the first method includes sending a second authentication response to the serving access management function, the second authentication response containing a UE identifier of the remote unit, a validity time and the $K_{SEAF}$. In further embodiments, the first mobile communication network may be a non-public network ("NPN"), such as a standalone non-public network ("SNPN"), and the service provider may be a second mobile communication network, such as a Public Land Mobile Network ("PLMN").

In some embodiments, the first method includes binding a first identifier of the remote unit (e.g., the NAI) that is specific to the service provider to a second identifier that is used in the first mobile communication network (e.g., UE ID or SUPI). In certain embodiments, the first method further includes receiving a deregistration request from the AAA server to deregister the remote unit, verifying the deregistration request, and triggering removal of the binding of first identifier to second identifier (e.g., by sending a deregistration request to the UDM).

In some embodiments, the first method includes receiving a reauthentication request from the AAA server and sending a routing request to a user data management function. ere, the first method further includes receiving a routing response containing an identifier of a serving access management function and forwarding the reauthentication request to the serving access management function.

In certain embodiments, the reauthentication request includes a routing identifier. In such embodiments, sending the routing request may include both identifying the user data management function from the routing identifier and sending the routing request to the identified user data management function.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of an authentication proxy in a mobile communication network, the method comprising:
   receiving a registration request for a user equipment ("UE"), wherein the UE does not have a subscription with the mobile communication network;
   identifying a service provider of the UE;
   transmitting an authentication message to an authentication, authorization and accounting ("AAA") server of the identified service provider;
   receiving an authentication response from the AAA server in response to successful authentication of the UE, the authentication response comprising a master session key; and
   deriving a set of security keys using the master session key.

2. The method of claim 1, wherein the registration request comprises a network access identifier ("NAI"), the method further comprising authorizing the registration request by identifying a realm of the NAI and verifying that a service agreement exists between the mobile communication network and the service provider.

3. The method of claim 1, wherein the authentication response includes a routing identifier of the mobile communication network and a validity time for the master session key, wherein reauthentication of the UE is required after expiry of the validity time.

4. The method of claim 1, wherein the derived set of security keys includes an authentication server function key ("$K_{AUSF}$") and a security anchor function key ("$K_{SEAF}$"), the $K_{AUSF}$ being derived from the master session key and the $K_{SEAF}$ being derived from the $K_{AUSF}$.

5. The method of claim 4, wherein the registration request is received from an access management function serving the UE, the method further comprising transmitting a second authentication response to the serving access management function, the second authentication response comprising an identifier of the UE, a validity time and the $K_{SEAF}$.

6. The method of claim 1, further comprising binding a first identifier of the UE that is specific to the service provider to a second identifier that is specific to the mobile communication network.

7. The method of claim 6, further comprising:
receiving a deregistration request from the AAA server to deregister the UE;
verifying the deregistration request; and
triggering removal of the binding of first identifier to second identifier.

8. The method of claim 1, further comprising:
receiving a reauthentication request from the AAA server;
transmitting a routing request to a user data management function;
receiving a routing response comprising an identifier of a serving access management function; and
forwarding the reauthentication request to the serving access management function.

9. The method of claim 8, wherein the reauthentication request includes a routing identifier, wherein transmitting the routing request comprises identifying the user data management function from the routing identifier and transmitting the routing request to the identified user data management function.

10. An authentication proxy apparatus in a mobile communication network, the apparatus comprising:
a memory; and
a processor with the memory and configured to cause the authentication proxy apparatus to:
receive a registration request for a user equipment ("UE"), wherein the UE does not have a subscription with the mobile communication network;
identify a service provider of the UE;
transmit an authentication message to an authentication, authorization and accountins ("AAA") server of the identified service provider, and
receive an authentication response from the AAA server in response to successful authentication of the UE, the authentication response comprising a master session key; and
derive a set of security keys using the master session key.

11. The apparatus of claim 10, wherein the registration request comprises a network access identifier ("NAI"), wherein the processor is configured to cause the authentication proxy apparatus to authorize the registration request by identifying a realm of the NAI and verifying that a service agreement exists between the mobile communication network and the service provider.

12. The authentication proxy apparatus of claim 10, wherein the authentication response includes a routing identifier of the mobile communication network and a validity time for the master session key, wherein reauthentication of the UE is required after expiry of the validity time.

13. The authentication proxy apparatus of claim 10, wherein the derived set of security keys includes an authentication server function key ("$K_{AUSF}$") and a security anchor function key ("$K_{SEAF}$"), the $K_{AUSF}$ being derived from the master session key and the $K_{SEAF}$ being derived from the $K_{AUSF}$.

14. The authentication proxy apparatus of claim 13, wherein the registration request is received from an access management function serving the UE, wherein the processor is configured to cause the authentication proxy apparatus to transmit a second authentication response to the serving access management function, the second authentication response comprising an identifier of the UE, a validity time and the $K_{SEAF}$.

15. The authentication proxy apparatus of claim 10, wherein the processor is configured to cause the authentication proxy apparatus to bind a first identifier of the UE that is specific to the service provider to a second identifier that is specific to the mobile communication network.

16. The authentication proxy apparatus of claim 15, wherein the processor is configured to cause the authentication proxy apparatus to:
receive a deregistration request from the AAA server to deregister the UE;
verify the deregistration request; and
trigger removal of the binding of first identifier to second identifier.

17. The authentication proxy apparatus of claim 10, wherein the processor is configured to cause the authentication proxy apparatus to:
receive a reauthentication request from the AAA server;
transmit a routing request to a user data management function;
receive a routing response comprising an identifier of a serving access management function; and
forward the reauthentication request to the serving access management function.

18. The authentication proxy apparatus of claim 17, wherein the reauthentication request includes routing identifier, wherein to transmit the routing request, the processor is configured to cause the authentication proxy apparatus to identify the user data management function from the routing identifier and transmit the routing request to the identified user data management function.

* * * * *